Figure 1:
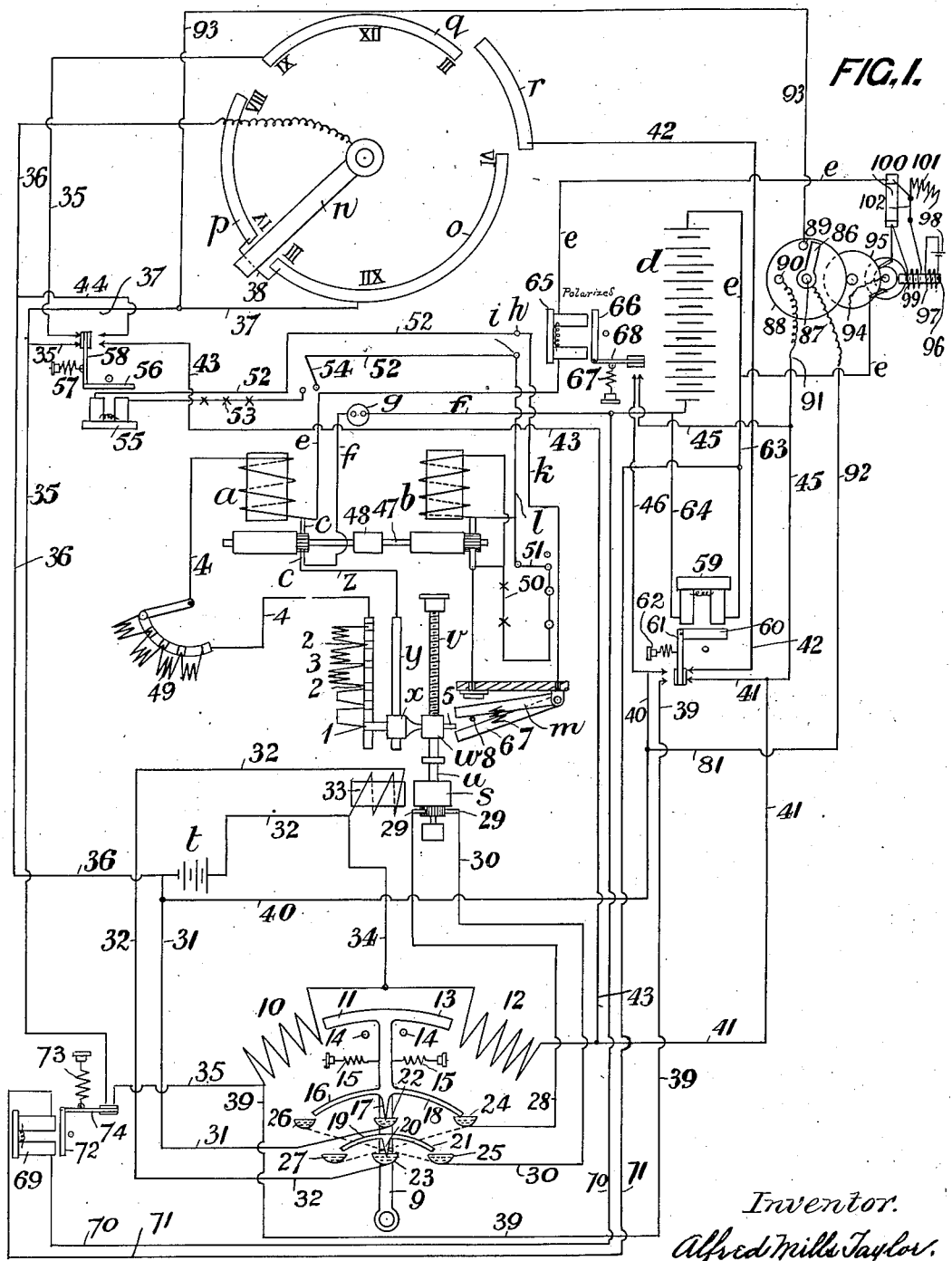

A. M. TAYLOR.
SYSTEM OF ELECTRICAL DISTRIBUTION.
APPLICATION FILED JAN. 23, 1906.

1,004,826.

Patented Oct. 3, 1911.

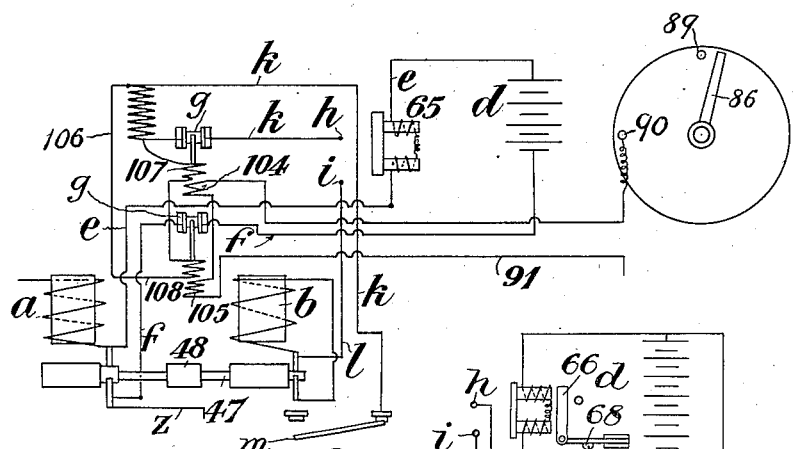
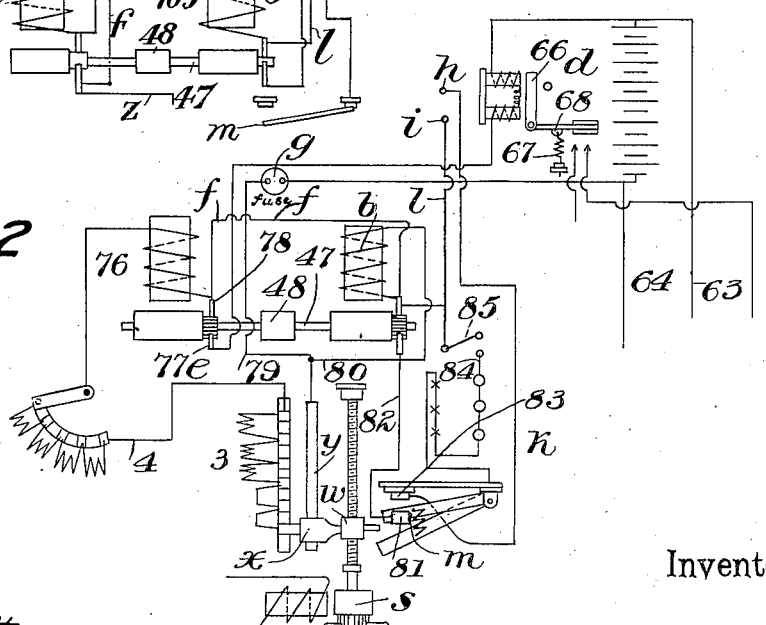

A. M. TAYLOR.
SYSTEM OF ELECTRICAL DISTRIBUTION.
APPLICATION FILED JAN. 23, 1906.
1,004,826.
Patented Oct. 3, 1911.
3 SHEETS—SHEET 3.
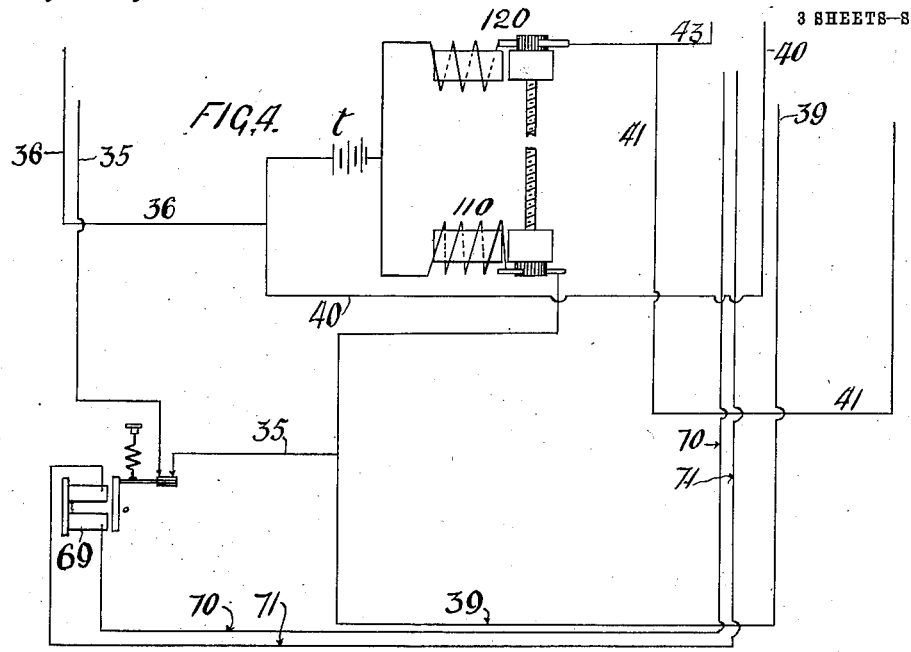
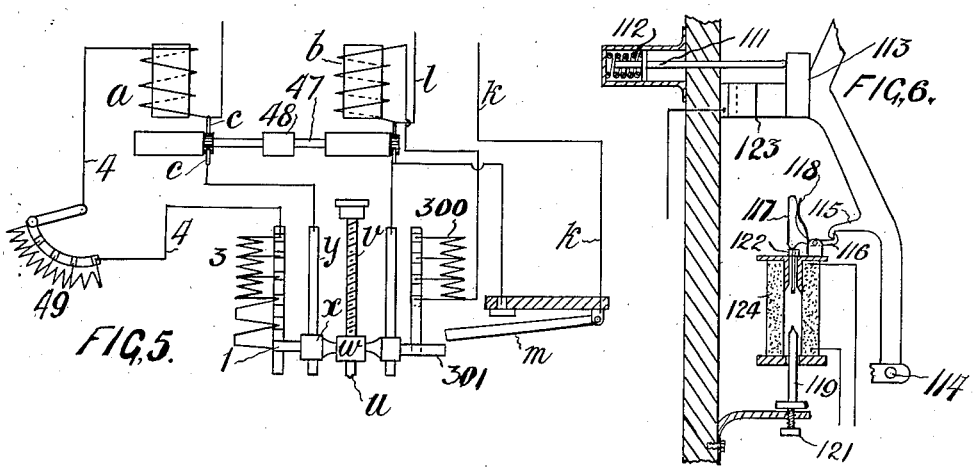
Witnesses
Jesse N. Lutton
A. Sommers
Inventor
Alfred Mills Taylor
by Henry Orth Jr.
Atty

UNITED STATES PATENT OFFICE.

ALFRED MILLS TAYLOR, OF BIRMINGHAM, ENGLAND.

SYSTEM OF ELECTRICAL DISTRIBUTION.

1,004,826.          Specification of Letters Patent.          Patented Oct. 3, 1911.

Application filed January 23, 1906. Serial No. 297,521.

*To all whom it may concern:*

Be it known that I, ALFRED MILLS TAYLOR, a subject of the King of Great Britain and Ireland, residing at Avondale, Ashfield Road, King's Heath, Birmingham, England, have invented new and useful Improvements in and Appertaining to Systems of Distribution of Electricity, of which the following is a specification.

This invention comprises improvements in and appertaining to systems of distribution of electricity and has for its object to enable consumers of electricity to obtain a supply independently of the supply company's mains at certain specified periods or under certain conditions.

According to this invention each consumer of electric current is provided with a private storage system fitted with certain apparatus hereinafter described whereby, for instance, the power load and lighting load are never allowed to overlap but when the second load is put on, or due to be put on, the first load is automatically transferred to the private storage and to this extent the motor-load-development limit of the station is increased.

In order to enable the invention to be readily understood reference is made to the accompanying drawings in which—

Figure 1 illustrates the invention as applied to a system in which a dynamo is employed for charging the storage batteries. Fig. 2 illustrates the invention as applied to a system in which a booster is employed for charging the batteries. Fig. 3 is a view of the system according to Fig. 1 with a duplex cut out for the primary and secondary circuits. Fig. 4 is a diagram of part of a system similar to Fig. 1 but having two motors for driving the screw gear and connected to the relays directly instead of two solenoids as in Fig. 1. Fig. 5 is a diagram of part of a system similar to Fig. 1 but having a rheostat in the motor field winding as well as in the field winding of the dynamo and Fig. 6 is a sectional elevation of one form of cut out suitable for use as indicated in Figs. 1 and 3.

In the system according to Fig. 1 the electric accumulators are normally charged by a shunt wound dynamo $a$ coupled to a motor $b$. The brushes $c\ c$ of the dynamo are connected to the secondary battery $d$ by the wires $e\ f$ and there may be a fuse $g$ or automatic cut-out arranged in say the wire $f$ and a meter switch, hereinafter described, in the wire $e$.

The motor $b$ receives current from the mains $h$ and $i$ through the leads $k$ and $l$ and in $k$ is inserted the main switch $m$. In connection with the foregoing there is a time controlled switch arm $n$ and any convenient arrangement of contact pieces $o$, $p$, $q$ and $r$, which switch arm closes and opens at various times the circuit of a relay which in turn operates the shunt regulating switch controlling the field of the dynamo $a$, or of the motor $b$, and the switch $m$ which connects the motor with the mains $h$ and $i$. One relay according to this invention comprises a small motor $s$ which is supplied with current in one direction or the other from a relay battery $t$. The shaft $u$ drives a screw $v$ running in suitable bearings and the screw $v$ moves a nut $w$ to and fro. The nut $w$ on the left hand side is shown furnished with a slider contact $x$ moving over a contact bar $y$ which is connected with one brush $c$ of the dynamo $a$ by a wire $z$. The contact $x$ by means of an extension 1 is adapted to contact with the various studs 2, 2, of a rheostat 3 inserted in the wire 4 running through the field winding to the other brush $c$ of the dynamo $a$. The nut $w$ on the right hand side is shown furnished with a projection 5 which, when the nut $w$ travels upward will strike the switch arm $m$ and close the latter. A second arm 6 may be connected to the arm $m$ by a spring 7 and may project farther into the path of the projection 5 than the arm $m$, so that when the nut $w$ descends the projection engages the arm 6 and the subsequent extension of the spring 7 will give a quick opening to the arm $m$, for which a suitable stop 8 may be provided. The armature of the relay motor $s$ is driven in one or the other direction according to the movement of the switch arm 9 which may be rocked in one direction by the magnet winding 10 attracting its armature 11, or in the other direction by the magnet winding 12 attracting its armature 13. Stops 14 limit the movement of the arm 9, which arm may be retained in its midway position by oppositely acting or zero springs 15.

Upon the arm are two trident contacts, 16, 17, 18 and 19, 20, 21 respectively. The contacts 17 and 20 always dip into mercury in the cups 22 and 23 respectively and in the right hand position of the arm 9 the contacts 18, 21 dip into cups 24 and 25 respectively while in the left hand position of the arm 9, the contacts 16, 19 dip into mercury cups 26, 27 respectively. The cups 26 and 25 are cross connected as shown by dotted line, as also are the cups 24 and 27. The cup 24 is connected by wire 28 with one brush 29 of the motor, while the cup 25 is connected by wire 30 with the other of such brushes 29. The cup 22 is connected by wire 31 with one pole of the relay battery *t*, while the cup 23 is connected by the wire 32 through the field winding 33 of the motor to the opposite pole of the battery *t*. The inner ends of the magnet windings 10 and 12 are connected by a common wire 34 and thence by the wire 32 to one pole of the relay battery *t*. The opposite end of the winding 10 is under certain conditions connected to the opposite pole of the relay battery *t* either firstly by way of wire 35, contact *q*, time switch arm *n*, and wire 36 or secondly by way of wire 35, branch 37, contact *o* or contact *p*, (these two contacts being connected by wire 38) switch arm *n* and wire 36 or thirdly by way of wire 39 and wire 40 or fourthly by way of wire 35, wire 37, wire 93, arm 86, wire 92 and wire 40. The opposite end of the winding 12 is under certain other conditions connected to the opposite pole of the battery *t* firstly by way of wire 41, wire 42, contact *r*, switch arm *n*, and wire 36 or secondly by way of wire 41, wire 43, wire 44 and wire 36 or thirdly by way of wire 41, wire 45, wire 46 and wire 40 or fourthly by way of wire 41, wire 45, wire 91 arm 86, wire 92 and wire 40.

The operation is as follows:—The arm *n* of the time switch in the position shown is about to make contact with the plate *p* at 4 a. m. At this hour the following circuit is closed from the arm *n* through contact *p*, wire 38, plate *o* wire 37, wire 35, coil 10, wire 34, wire 32, battery *t* and wire 36 back to the arm *n*. The coil 10 will thus be energized and will attract its armature 11, causing the lever 9 to rock to the left and to bring the contact arms 16 and 19 into their respective mercury cups 26 and 27. The following circuit is thus closed viz. from the cup 26 through one of the wires shown in dotted lines to the cup 25, through wire 30, brush 29, through the armature *s* of the motor to the opposite brush 29, through wire 28 and cup 24, thence through the other wire shown in dotted line to the cup 27, through contact arms 19 and 20, mercury cup 23, wire 32, the latter including the winding of the field magnet 33 of the small motor, thence to the battery *t*, from the opposite pole of which the current passes by way of wire 31, mercury cup 22 and arm 17 back to the arm 16. It is seen that the circuit thus closed energizes the small motor so that its armature *s* runs in one direction, thereby turning the screw *v* and causing the nut *w* to rise (unless the nut *w* is already in its highest position) so that the switch *m* is closed and puts the motor *b* on to the mains *h* and *i* and the continued rising of the nut *w* then effects a reduction of the resistance 3 in the field winding of the dynamo *a*. The motor *b* now drives the shaft 47 and power for, say, a printing machine, may be taken off the belt pulley 48, the motor *b* also drives the dynamo *a* which charges the accumulator battery *d* through the wires *e* and *f*. The resistance in the field winding of the dynamo *a* may be further varied by the hand lever of the rheostat 49. The charging of the accumulators if still incomplete is now continued until 8 a. m. when the arm *n* passes from off the plate *p* and for the space of, say, an hour, no circuit is completed through the small motor and during this period the motor and dynamo circuits may be broken by hand, if desired. At 9 a. m. the circuits will be again completed and the arm *n* passing on to the plate *q* the circuit will be the same as before, excepting that the plate *q* is connected directly to the wire 35, and the small motor armature *s* will maintain the nut *w* in its raised position and the secondary battery *d* will, if necessary, be further charged. At, say, 3 p. m. the arm *n* passes from contact plate *q* breaking the circuit through the coil 10 and on to the contact plate *r* when the following circuit will be closed: from the arm *n*, through plate *r*, wire 42, wire 41, coil 12, wire 34, wire 32, battery *t*, wire 36 back to arm *n*. The coil 12 being now energized will attract its armature 13 on the lever 9, which latter was brought back to the neutral position by the springs 15 when the coil 10 was deënergized and the contact arm 18 will now enter the mercury cup 24 and the arm 21 the cup 25, thereby connecting the cup 22 with the cup 24 and the cup 23 with the cup 25 and thus reversing the current from the battery *t* through the armature *s* of the small motor which will rotate in the opposite direction and cause the nut *w* to descend upon the screw *v*, placing more resistance in the field of the dynamo and opening the switch *m* thereby removing the motor *b* from the mains. The dynamo *a* will now receive current from the charged battery *d* and will run as a motor giving power to the shaft 47 during the time of the evening load say from 3 to 6 p. m. If desired there may be a lighting or subsidiary power circuit 50, connected to the terminals of the motor *b* which circuit may be closed by a switch 51, so that the motor *b* will now run as a dynamo and furnish current for the circuit 50.

From the foregoing it will be seen that the coil 10 acts to control the charging of the accumulator battery *d* and the coil 12 the discharging thereof, and at times when the coil 10 is energized by reason of the arm n contacting with one of the segments of the time switch should one of the various devices cause the coil 12 to be energized the arm 9 may take up a midway position. Now there may be arranged upon the consumer's premises a lighting circuit 52 connected up to the mains h and i and including one or any number of lamps 53 and closed by a switch 54. This circuit also includes the windings of a magnet 55, the armature 56 of which is held normally in the off position by a spring 57 acting on a contact arm 58 connected with the pivoted armature 56 and normally, as shown, bridging the gap in the wire 35. During the period covered by the contact plate q say 9 a. m. to 3 p. m. should a fog come on, the consumer closes the switch 54 to turn on the light or lights 53, thereby energizing the magnet 55 which attracts its armature 56 and rocks the arm 58 away from the terminals of the wire 35, breaking the circuit of the charging coil 10 and bridging the gap between the wires 43 and 44 so completing the circuit of the discharging coil 12, the last named circuit including wire 43, wire 41, coil 12, wire 34, wire 32, battery t, wire 36, wire 44, and contact arm 58. Thus during a fog the motor b is removed from the mains h and i (by the opening of the switch m through the coil 12 operating the relay switch 9, the motor s and the nut w) and the shaft 47 is driven by the dynamo a running as a motor receiving current from the storage battery d.

Across the terminals of the battery d there may be connected the winding of a magnet 59 having in connection with its pivoted armature 60 a contact arm 61 and a spring 62 to pull the armature 60 to the "off" position. When the electromotive force of the battery d is sufficiently high for discharging, current flows in the circuit comprising the battery d, wire 64, magnet 59 and wire 63 and the pull of the magnet 59 on its armature 60 is sufficient to overcome the pull of the spring 62, so that the armature is maintained in the "on" position and the arm 61 bridges the gap between the wires 41, 42 thus closing the circuit through the discharge coil 12. When the E. M. F. is too low for discharging, the pull of the magnet 59 is diminished to such an extent that the spring 62 is able to pull off the armature, thus opening the gap between 41 and 42, and closing the circuit of the charging coil by bridging the gap between the wires 39 and 40.

A polarized magnet 65 normally holds its armature 66 on, thereby leaving the wires 46, 45 disconnected; should the charging current for the battery d become excessive, however, the permanent magnetism of the magnet 65 will be weakened sufficiently to permit the spring 67 to pull off the armature 66 and so cause the arm 68 to bridge the gap between the wires 46 and 45, thereby completing the circuit of the discharge coil as follows: wire 45, wire 41, coil 12, wire 34, wire 32, battery t, wire 40, wire 46 and arm 68. When however the circuit of the charging coil 10 is completed, say by the time switch arm n contacting with one of the parts o, p, q, the nut w commences to rise, and reduces the resistance in the field winding of the dynamo a thereby strengthening the charging current. The rise of the nut w is rapid at first but before it has risen very far the charging current becomes so strong that the excess-rate-of-charge relay 65 will close the circuit of the coil 12 which then counteracts the coil 10 so that the lever 9 will be caused to take up a midway position and the circuit of the little motor being thus broken no further rise of the nut w takes place and the back pressure of the cells quickly rises so that the charging current is reduced, then after a short time the armature 66 will be attracted again and permit the completion of the small motor circuit for a short time and a further small rise of the nut w takes place. Thus the nut w moves upward and reduces the resistance little by little and when it arrives near to the top of the screw, or soon after, it will be time for the meter switch 86 or the maximum E. M. F. switch 74 to act to prevent further rise. The gap between the plates o and p permits of the circuit of the coil 10 being broken so that when the relay 65 again completes the circuit of the coil 12 the motor s will reverse and will lower the nut w which may have risen to too great an altitude during the night. During discharge the reversed flow of current strengthens the residual magnetism of the magnet 65.

The windings of the magnet 69 may be connected across the battery terminals by wires 70 and 71; should the electro-motive force of the battery d become excessive, the pull of the magnet upon the armature 72 will overcome the pull of the spring 73 upon the arm 74 and will cause the latter to disconnect the terminals of the wire 35 and open the circuit of the charging coil 10.

When a booster is employed in place of the dynamo a the circuits are arranged as seen in Fig. 2. The wire e is now connected to the brush 77 of the booster 76 and the wire f to the brush 78, the other end of the wire f being connected to one terminal of the motor b as shown. The bar y, over which the slider x moves, is now connected with one terminal of the battery d by a wire 79 in which the automatic cut out or fuse g may be arranged, and by a wire 80 with one terminal of the motor b. The switch arm m is of such a construction that it never moves out of contact with the contact 81 which is connected to one terminal of the motor $b$ by wire 82. The opposite contact 83 is connected to the wire $k$. When the arm $m$ is closed on to the contact 83 the motor $b$ is put on to the mains $h$, $i$, and the continued rise of the nut $w$ effects a reduction of resistance in the rheostat 3 in the field winding of the booster 76. The latter then adds sufficient E. M. F. to the E. M. F. of the mains $h$ and $i$ to charge the accumulator battery $d$ being driven by the motor $b$ which at the same time provides the power taken off from the pulley 48. The charging circuit is as follows:—main $h$, wire $k$, contact 83, arm $m$, contact 81, wire 82, wire 80, wire 79, battery $d$, wire $e$, armature of booster 76, wire $f$, wire $l$, and main $i$. The booster field winding with the rheostat 3 is in parallel with the booster armature and the cells, as also is the shunt motor $b$. Therefore when the switch $m$ opens, the power load is removed from the mains and one circuit then includes the cells, the booster armature, the booster field winding and another circuit includes the cells, the booster and rheostat, and the motor $b$. The booster 76 now acts as a motor and aids the motor $b$ which will thus continue to give power to the shaft 47, during say a fog, or during the time of the evening lighting load. There may be a lighting or subsidiary power circuit 84, connected in parallel with the motor $b$ which circuit may be closed by a switch 85 so as to receive current from the battery $d$ either by itself or simultaneously with the motor $b$.

The nut $w$ may be arranged to regulate two similar rheostats 3 and 300 as shown in Fig. 5, 3 being for the dynamo $a$ or for the booster 76 and 300 for the motor $b$, the connections being so made that while the part 1 in rising decreases the resistance in the field winding of the dynamo, or booster, the part 301 also rising increases the resistance in the field winding of the motor.

To insure that the accumulator battery shall be charged, say each day, with the amount of current expended during, say, the previous day's working, a switch arm 86 is attached to the slowest moving axle 87 or dial of an ampere hour meter. At two convenient points on the corresponding fixed dial 88 are fixed two contact springs, for instance spring studs 89, 90, for engaging the arm 86 and if desired constituting stops for same. The stud 89, corresponds with the zero position of the switch arm 86 when zero ampere-hours have been passed through the meter into the battery $d$ and the stud 90 with the switch arm position when a maximum charge has been passed through the meter into the battery $d$. Supposing therefore the battery $d$ to be charged and the arm 86 to have been adjusted so as to rest upon the stud 90, a circuit will be completed through the discharging coil 12, the stud 90 being connected with this coil by means of a wire 91, the wire 45, and the wire 41; and the arm 86 being connected with the battery $t$ by a wire 92 and the wire 40. The discharge coil 12 will thus counteract the charging coil 10 sufficiently to break the circuit of the small motor $s$ so that no further reduction in resistance occurs and owing to the rise in back pressure of the cells practically no further charging takes place. Directly the circuit of coil 10 is broken, however, by any one of the aforesaid means the coil 12 operates to reverse the motor when discharge will take place. During discharge the meter will be driven reversely so that the arm 86 moves counter clockwise until at about the time of minimum E. M. F. it comes against the stud 89 when a circuit will be closed through the charging coil 10, thus if the minimum E. M. F. relay 59 should fail to make contact properly with wires 39 and 40 contact will be made by way of wires 93, 37, and 35 and the E. M. F. relay having broken the circuit of the coil 12 the motor armature $s$ will be operated to bring about recharging of the battery $d$.

The wire 91 may lead to the windings 104 and 105, Fig. 3, of circuit breakers $g$, one of which is seen in the high tension wire $k$ and the other in the low tension wire $f$, the circuit breakers are preferably of the spring throw off type represented in Fig. 6 in which a plunger 111 is held by a spring 112 against the switch arm 113 pivoted at 114. The arm is prevented from being thrown off to break the circuit by means of a hook 115 on the arm engaging a hook 116 on a bell crank lever 117, the latter being maintained in the holding position by a blade spring 118. A coil 124 which would comprise both the windings 105 and 108 or the windings 104 and 107 is adapted when energized sufficiently to suck up the core 119 which normally rests upon an adjusting screw 121. The core at the top of its stroke strikes the pin 122 which thus causes the lever 117 to tilt, thereby disengaging the hooks 115, 116 and permitting the spring 112 to throw off the arm 113 and to break the circuit at 123. Thus when the arm 86 arrives upon the contact stop 90 the circuits of the motor $b$ and dynamo $a$ are both opened and further charging of the battery is prevented. A shunt wire 106 may be put across any part of say the wire $k$ having appreciable resistance so that in the event of too great a rush of current, the coils 107 and 108 would operate similarly to the coils 104 and 105.

To compensate for the ampere-hour waste in the accumulator itself, there may be attached to the fastest running wheel of the meter train, or to the axle 94 thereof, a conductor disk 95. A magnet 96 energized by the winding 97 supplied with current from a local battery 98, may be arranged to overlap a portion of the disk 95. The magnet 96 by developing Foucault currents in the opposed portion of the disk 95 acts as a magnetic brake to retard the motion of the disk 95. A second winding 99 upon the magnet 96 is connected for instance, in shunt across a strip 100 of German silver inserted in the main battery circuit, so that the current flowing in the coil 99 bears always a certain proportion to the charging current. Thus during charging the two windings 97 and 99 act in unison and retard the movement of the disk 95 but during discharge, when the current flows in the reverse direction through the coil 99, the latter opposes the coil 97 and the retardation of the disk 95 is consequently either reduced or completely nullified. A rheostat 101 is provided for regulating the action of the coil 99. By this means the arm 86 takes longer to move from stud 89 to stud 90 than in the reverse direction, and consequently the charging period is always greater than the period of discharge, thus allowing for the internal or other waste in connection with the secondary battery $d$.

Instead of the single motor $s$ controlled by the coils 10 and 12 hereinbefore described, there might be two motors 110 and 120 as shown in Fig. 4 similar to $s$ one adapted to rotate the screw $v$ in one direction and the other to rotate the screw $v$ in the other direction: Furthermore these motors could be directly connected up to the various appropriate contact plates and relays thus dispensing with the coils 10 and 12 also as shown in Fig. 4 in which the same connections are made with the motors 110 and 120 as were made with the coils 10 and 12 respectively.

What I claim as my invention and desire to secure by Letters Patent is:—

1. Apparatus for controlling the storage of electricity comprising in combination, electric storage cells, a reversible dynamo-electric machine, a motor operatively connected with the latter and adapted to be connected to supply mains and to receive current therefrom to drive said reversible dynamo-electric machine during the charging periods and to be cut off from said mains when said dynamo-electric machine is reversed for the discharge of said cells, and an automatic control adapted under certain conditions to connect said motor to said mains and to adjust the circuits of said dynamo-electric machine for causing the latter to be driven in the direction for charging said cells and under other conditions to disconnect said motor from said mains and to reverse said dynamo-electric machine for enabling the power current supply to be obtained from said cells.

2. Apparatus controlling the storage of electricity comprising in combination electric storage cells, charging means for said cells, a motor operatively connected with said charging means, a main switch in circuit with said motor, a rheostat controlling said charging means, a local circuit, a local switch therein, a translating device in said local circuit and controlled by said local switch, a second local circuit, a switch and a translating device in said second local circuit, a rocking lever in operative relation with each of said translating devices, one of which devices controls the operation of said lever to close the main switch and operate the rheostat, to cause said charging means to charge the cells, and the other of said translating devices controlling the operation of said lever to open said main switch and operates said rheostat to reverse the function of said charging means, substantially as set forth.

3. Apparatus controlling the storage of electricity comprising in combination, electric storage cells, charging means for said cells, a motor operatively connected with said charging means, a switch in circuit with said motor, a rheostat controlling said charging means, a solenoid controlling a circuit for closing said switch and operating said rheostat to cause said charging means to charge said cells, and a solenoid controlling a circuit for opening said switch and reversely operating said rheostat to reverse the function of said charging means, substantially as set forth.

4. Apparatus controlling the storage of electricity comprising in combination electric storage cells, charging means for said cells, a motor operatively connected with said charging means, a switch in circuit with said motor, a rheostat controlling said charging means, gear operating on said switch and said rheostat, a small motor driving said gear, means controlling said small motor and gear to close said switch and operate said rheostat to cause said charging means to charge said cells, and means controlling said small motor and gear to open said switch and reversely operate said rheostat to reverse the function of said charging means substantially as set forth.

5. Apparatus controlling the storage of electricity comprising in combination electric storage cells, charging means for said cells, a motor operatively connected with said charging means, a switch in circuit with said motor, a rheostat controlling said charging means, gear operatively connected with said switch and said rheostat, a small motor driving said gear, a solenoid controlling the circuit of said small motor in one direction whereby said small motor closes said switch and operates said rheostat to cause said charging means to charge said cells, and a second solenoid controlling said small motor circuit in the reverse direction whereby said small motor opens said switch and reversely operates said rheostat to reverse the function of said charging means substantially as set forth.

6. Apparatus controlling the storage of electricity comprising in combination electric storage cells, charging means for said cells, a motor operatively connected with said charging means, a switch in circuit with said motor, a rheostat controlling said charging means, gear operating said switch and said rheostat, a small motor driving said gear, a forward driving circuit for said small motor, a rearward driving circuit for said small motor, a circuit make and break opening one of said circuits and closing the other, a solenoid controlling said make and break in one direction whereby said small motor closes said switch and operates said rheostat to cause said charging means to charge said cells, and a second solenoid controlling said make and break in the other direction whereby said small motor opens said switch and reversely operates said rheostat to reverse the function of said charging means substantially as set forth.

7. Apparatus controlling the storage of electricity comprising in combination electric storage cells, charging means for said cells, a motor operatively connected with said charging means, a switch in circuit with said motor, a rheostat controlling said charging means, a revoluble screw, a nut working upon said screw, an abutment upon said nut operating said switch, a sliding contact upon said nut, a bar for said contact, a rheostat bar for said contact, a small motor driving said screw, a solenoid controlling the circuit of said small motor in one direction whereby said small motor operates said nut to close said switch and adjust said rheostat to cause said charging means to charge said cells, and a second solenoid controlling said small motor circuit in the reverse direction, whereby said small motor operates said nut to open said switch and reversely adjust said rheostat to reverse the function of said charging means substantially as set forth.

8. Apparatus for controlling the storage of electricity comprising in combination, electric storage cells, charging means for said cells, a motor operatively connected with said charging means, a main switch in circuit with said motor, electro-magnetic mechanism to operate the main switch, a local circuit, a battery in the latter, a switch in said local circuit, and a translating device in said local circuit controlling the electro-magnetic mechanism to close said main switch, a second local circuit including said battery, a switch in said second local circuit, a translating device in said second local circuit controlling the electro-magnetic mechanism to open said main switch, an electric meter in circuit with the cells, a switch arm driven by said meter and in circuit with the battery of said local circuits, a switch terminal in the path of said arm, said terminal and arm being in parallel with the switch of the first local circuit, a second switch terminal in the path of said arm, said second terminal and said arm being in parallel with the switch of the second local circuit, and retarding means for said arm automatically operating to cause the speed of said arm from the first terminal to the second terminal to be less than the speed of said arm from the second terminal to the first for the same flow of current, substantially as set forth.

9. Apparatus for controlling the storage of electricity comprising in combination electric storage cells, charging means for said cells, a motor operatively connected with said charging means, a main switch in circuit with said motor, electromagnetic switch operating means, a local circuit, a battery in the latter, a switch and a translating device controlling said means for closing of said main switch in said local circuit, a second local circuit including said battery, a switch and a translating device controlling said means for opening of the main switch, both in the second local circuit, an electric meter in circuit with the cells, a switch arm driven by said meter and in circuit with the battery of said local circuits, a switch terminal in the path of said arm, said terminal and said arm being in parallel with the switch of the first local circuit, a second switch terminal in the path of said arm, said second terminal and arm being in parallel with the switch of the second local circuit, an automatically variable magnetic brake operating to cause the speed of said arm from the first terminal to the second terminal to be less than the speed of said arm from the second terminal to the first terminal for the same flow of current, substantially as described.

10. Apparatus for controlling the storage of electricity comprising in combination electric storage cells, charging means for said cells, a motor operatively connected with said charging means, a main switch in circuit with said motor, means for operating the main switch, a local circuit, a battery in the latter, a switch and a translating device controlling said means for closing of said main switch both in said local circuit, a second local circuit including said battery, a switch and a translating device that controls said means for opening of said main switch both in said second local circuit, an electric meter in circuit with the cells, a switch arm driven by said meter and in circuit with the battery of said local circuits, a switch terminal in the path of said arm, said terminal and said arm being in parallel with the switch of the first local circuit, a second switch terminal in the path of said arm said second terminal and said arm being in parallel with the switch of the second local circuit, a conducting disk driven by said meter, a magnet of constant polarity in operative relation with said conducting disk, an electric coil in circuit with said cells and arranged to coincide with said polarity while the said arm moves from the first terminal to the second and to oppose said polarity during the movement of said arm from the second terminal to the first, substantially as set forth.

11. Apparatus for controlling the storage of electricity, comprising in combination electric storage cells, charging means for said cells, a motor operatively connected with said charging means, a main switch in circuit with said motor, means for operating the main switch, a local circuit, a time switch comprising a clock-driven switch-arm and a switch terminal in said local circuit, a translating device in said local circuit controlling said means for closing of said main switch, a second local circuit, a second switch terminal and a translating device for controlling said means for opening of said main switch and the reversal of the function of said charging means in said second circuit, a minimum electro-motive force relay across said cells normally closing a gap in the second local circuit and operating to close a path in parallel relation with the path including the arm and first-named contact of said time switch, a maximum electro-motive force relay across said cells normally closing a gap in the first-named local circuit and operating to open same, an excess rate of charge relay in series with said cells and operating to close a path in parallel with the path including said arm and the second-named contact of said time-switch and a lighting circuit relay in parallel relation with said motor and normally closing a gap in the first-named local circuit and operating to open same and to close a circuit in parallel relation with said arm and the second-named contact of said time switch, substantially as set forth.

12. Apparatus for controlling the storage of electricity, comprising a supply circuit, a motor included therein, storage cells, charging means operated by the motor and in circuit with said cells, a local circuit, a time switch therein, a translating device in a second local circuit, electro-magnetic means controlled by the time switch to change the direction of current through the translating device, said translating device controlling the current from the supply circuit through the motor.

13. Apparatus for controlling the storage of electricity, comprising a supply circuit, a motor therein, storage cells, charging means operated by the motor and in circuit with said cells, a local circuit, a time switch therein, a translating device in a second local circuit, a current reverser operated by local current and controlled by the switch to control local current through the translating device and thereby the supply circuit through the motor, an electric meter in circuit with the cells and having means controlling the local circuit through the reverser and independent of the time switch.

14. In apparatus for controlling the storage of electricity, a supply circuit, a motor included therein, storage cells, charging means operated by the motor and in circuit with said cells, a local circuit, a time switch therein, a translating device in a second local circuit, a current reverser actuated by local current and controlled by said switch to reverse current through the translating device and thereby control the operation of the motor, a meter in circuit with the charging device and cells, and suitable circuits closed by said meter to control the operation of the motor.

In testimony whereof I have signed my name to this specification in the presence of two subscribing witnesses.

ALFRED MILLS TAYLOR.

Witnesses:
ERNEST HARKER,
ETHEL M. WEBB.